Sept. 29, 1959      F. G. PASOTTI      2,906,391

FIRE FINISHING MACHINE FOR GLASS ARTICLES

Filed March 29, 1955      4 Sheets-Sheet 3

INVENTOR.
Felice G. Pasotti.
BY
Schmieding and Fultz
ATTORNEYS

Sept. 29, 1959　　　F. G. PASOTTI　　　2,906,391
FIRE FINISHING MACHINE FOR GLASS ARTICLES
Filed March 29, 1955　　　4 Sheets-Sheet 4
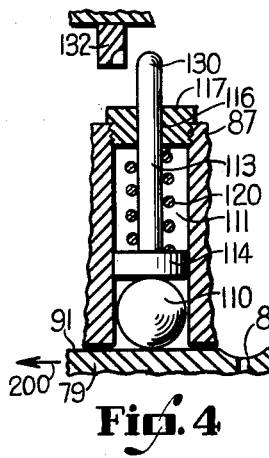
INVENTOR.
Felice G. Pasotti.
BY
Schmidling and Fultz
ATTORNEYS United States Patent Office 2,906,391
Patented Sept. 29, 1959

2,906,391

FIRE FINISHING MACHINE FOR GLASS ARTICLES

Felice G. Pasotti, Columbus, Ohio, assignor, by mesne assignments, to J. & L. Associates, Inc., a corporation of Ohio Application March 29, 1955, Serial No. 497,595

6 Claims. (Cl. 198—22)

The present invention relates to article handling apparatus.

In the production and handling of articles such as containers, packers' ware and the like, it is necessary to successively transfer articles from one article transporting means to another, with the articles being produced in steady flow production, or with steady flow operations being performed thereon. To effect automatic handling of the articles, it is necessary to employ special apparatus adapted to successively remove articles from a moving conveyor, and to then deposit the articles in a fixture on a machine for performing operations on the articles. It is also frequently advantageous to employ similar apparatus to remove the articles from the fixture and return them to the conveyor.

To successfully accomplish such mechanized handling of articles, the article transferring apparatus must be driven in precise synchronization with the two articles transporting means between which the articles are transferred in order to prevent upsetting of the articles and jamming of the apparatus. In the course of transporting the articles, however, certain of them inadvertently upset or become mispositioned, so as to be presented to the transferring apparatus in a disorderly manner whereby the apparatus is caused to jam. In such instances, due to the continuous nature of the operation, the complete production line is interrupted since more articles are continuously presented to the article transfer apparatus by the article transporting means feeding same, and such articles will pile up at the article transferring apparatus so long as said apparatus is jammed by the disorderly articles.

According to the present invention, a novel article transferring apparatus is provided which is adapted to be driven in synchronized relationship with the separate article transporting means between which the transferring of articles is effected. The apparatus is provided with clutch apparatus which allows its motion to cease when an upset or mispositioned article causes an obstruction. The present novel article transferring apparatus is further adapted to automatically resume its normal motion and resynchronize its movement with the separate article transferring means between which it is operating. In order to effect such automatic synchronized motion, it is only necessary to remove the jammed articles which have arrested movement of the article transferring apparatus. Immediately upon removal of the articles causing the jam, the article transferring apparatus will resume its motion in precise synchronization with the article transporting means and articles will be again picked up and deposited in a precise and orderly manner.

It is therefore an object of the present invention to provide a novel article transferring apparatus for successively transferring articles between article transporting means, which novel apparatus is adapted to be arrested against movement responsive to the jamming of articles, but which apparatus is adapted to automatically resume its motion in precise synchronization with the other portions of the article handling apparatus.

It is another object of the present invention to provide apparatus of the type described which includes means for rapidly and precisely adjusting the article transferring apparatus relative to separate article transporting means between which it is located, whereby articles are picked up and discharged by the article transferring means in precise timed relationship with the separate transporting means.

It is another object of the present invention to provide apparatus of the type described which includes means for readily adjusting the article transferring apparatus to operate with articles of various types and sizes and to handle the articles in an efficient manner without upsetting.

Further objects and advantages of the present invention will be apparent from the following description, reference being had to the accompanying drawings wherein a preferred form of embodiment of the invention is clearly shown.

In the drawings:

Figure 1 is a side elevational view, partially in section, of a machine for fire finishing glass articles. This view also illustrates the novel article transferring apparatus of the present invention used in connection with the fire finishing machine and a conveyor system which delivers articles to the machine and also carries the articles away from the machine after they have been fire finished. The section in Figure 1 is taken substantially along the line 1—1 of Figure 2;

Figure 4 is a schematic view showing a portion of the clutch mechanism utilized in the apparatus of the present invention;

Figure 5 is a second schematic view corresponding to Figure 4;

Figure 6 is a third schematic view corresponding to Figure 4;

Figure 7 is a broken perspective view of the clutch mechanism utilized in the apparatus of the present invention; and Figure 8 is a side elevational view of a mechanism for effecting adjustments of the apparatus of the present invention.

Figure 1:
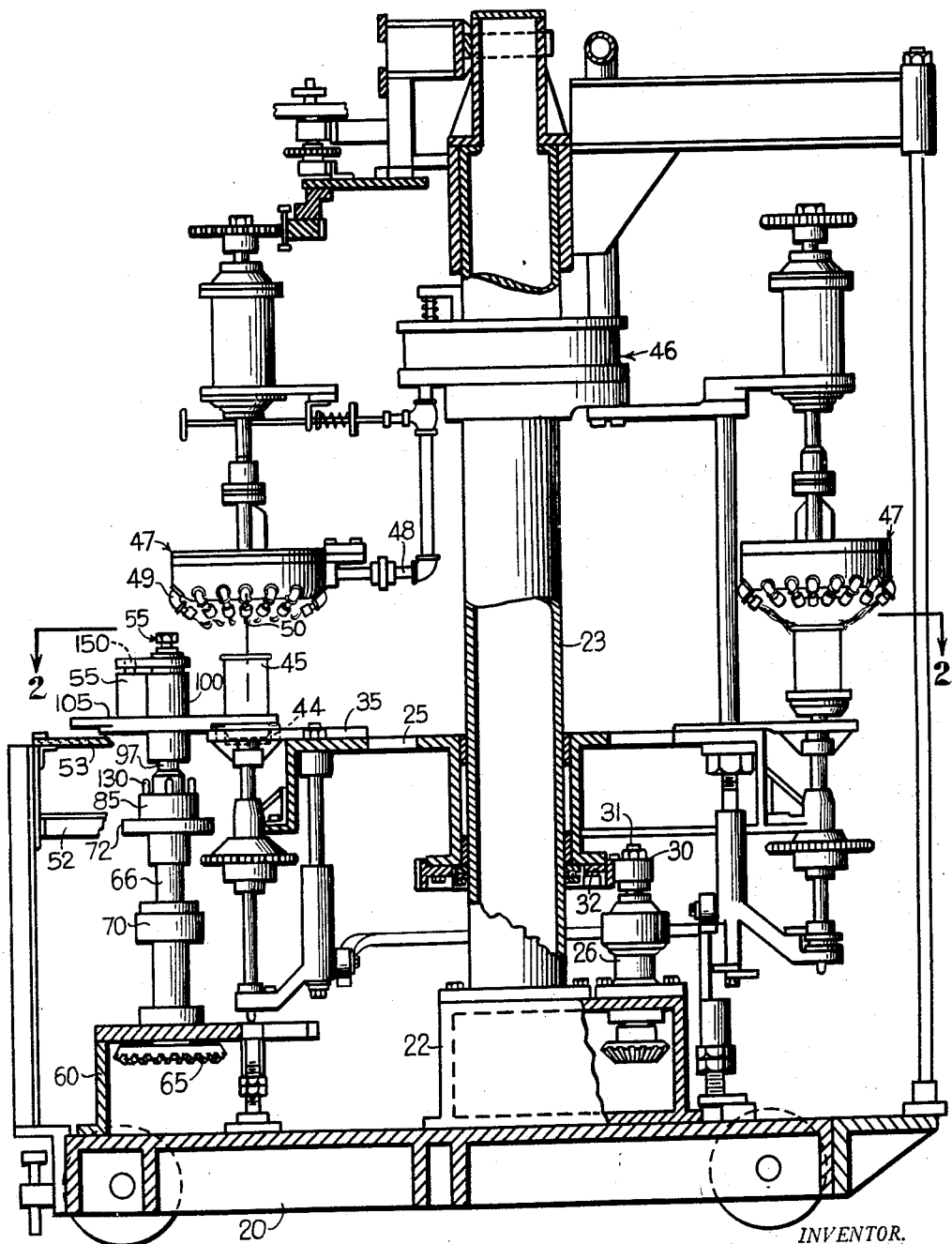

Referring next to the drawings, and particularly to Figure 1, a fire finishing machine for fire finishing glass articles is illustrated. Such machine includes a frame 20, which supports a housing 22. The housing, in turn, supports a vertical column 23. A turntable 25 is journaled for rotation on the column 23, and a suitable drive mechanism for the turntable is indicated generally at 26. The drive mechanism is supported by the housing 22 and motivated by a prime mover not illustrated. A gear 30, keyed to a shaft 31 on the drive unit 26, engages a driven bull gear 32 carried by the turntable 25. When the shaft 31 and the gear 30 are actuated by the prime mover, the bull gear 32 and turntable 25 will be rotated about the vertical axis of the column 23.

Figure 2:
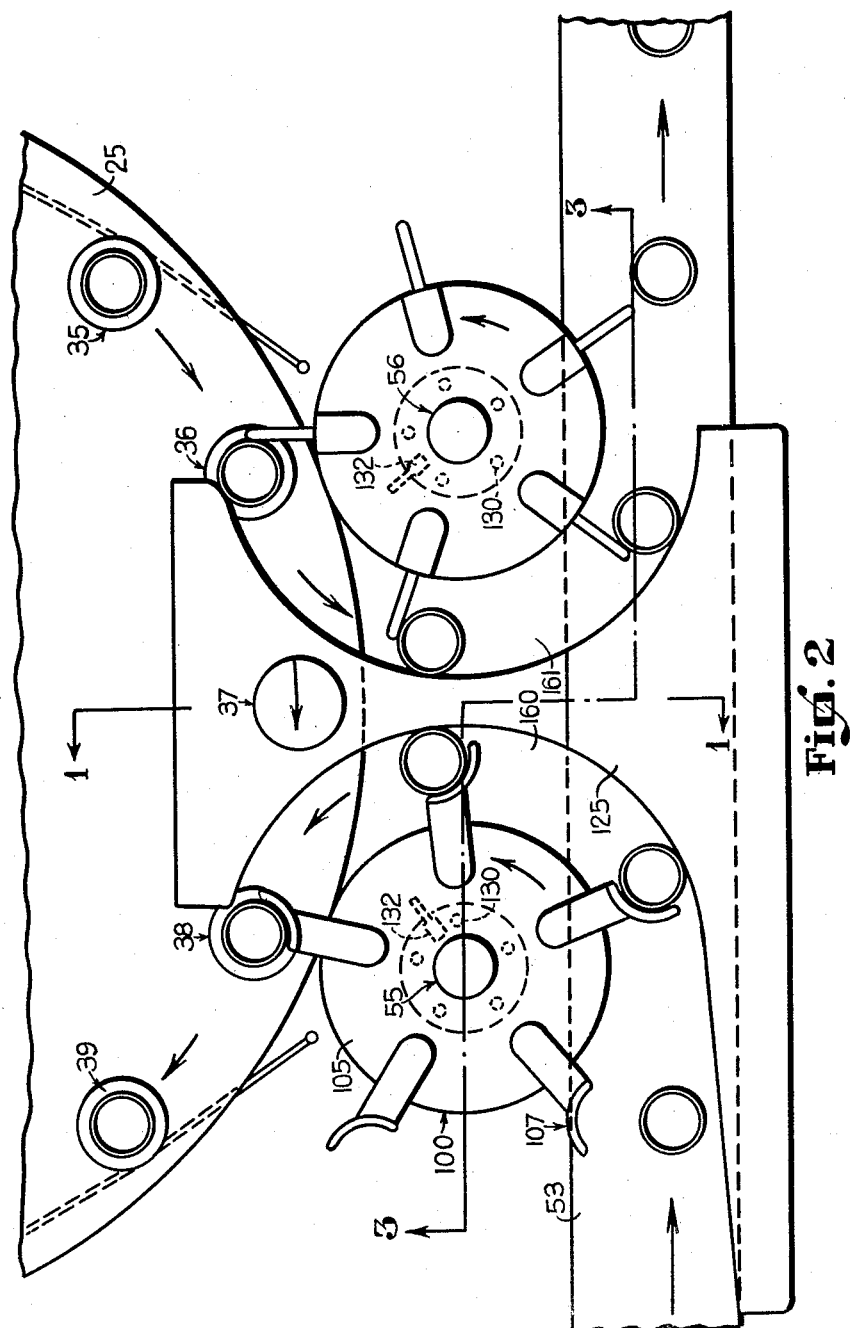
Figure 2 is a partial plan view of the conveyor, article transferring apparatus and turntable of the fire finishing machine illustrated in Figure 1.

As is best seen in Figure 2, the turntable includes a plurality of stations, each of which is adapted to receive and hold an article of packers' ware to be operated upon by the fire finishing machine. These stations are equally spaced around the peripheral edge of the turntable 25 with certain of the stations being indicated at 35, 36, 37, 38 and 39.

Referring again to Figure 1, which includes one of the stations 37 illustrated in section, it is seen that the stations include a fixture 44 properly recessed for receiving the base of an article 45. The typical station 37 also includes a burner head indicated generally at 47. A conduit 48 serves to supply gas to the burner head from a manifold 46 and suitable gas supply not illustrated. A plurality of burners 49 are each adapted to direct a flame inwardly to form a heating zone into which the glass articles are raised and lowered.

With further reference to Figure 1, conveyor frame 52 supports a continuous conveyor belt 53 which serves to supply articles to the fire finishing machine.

For transferring articles from the conveyor belt 53 to the stations on the turntable of the fire finishing machine, a novel article transferring apparatus is utilized with such apparatus being indicated generally at 55 in Figures 1 and 2. A second article transferring apparatus 56, of similar construction, is utilized for transferring articles from the fire finishing machine back to the conveyor belt. Hence the apparatus 55 serves as a loader and the apparatus 56 functions as an unloader. Due to the design of the machine, and the present novel article transferring apparatus, the motion can be reversed whereby the loader and unloader reverse their roles.

Figure 3:
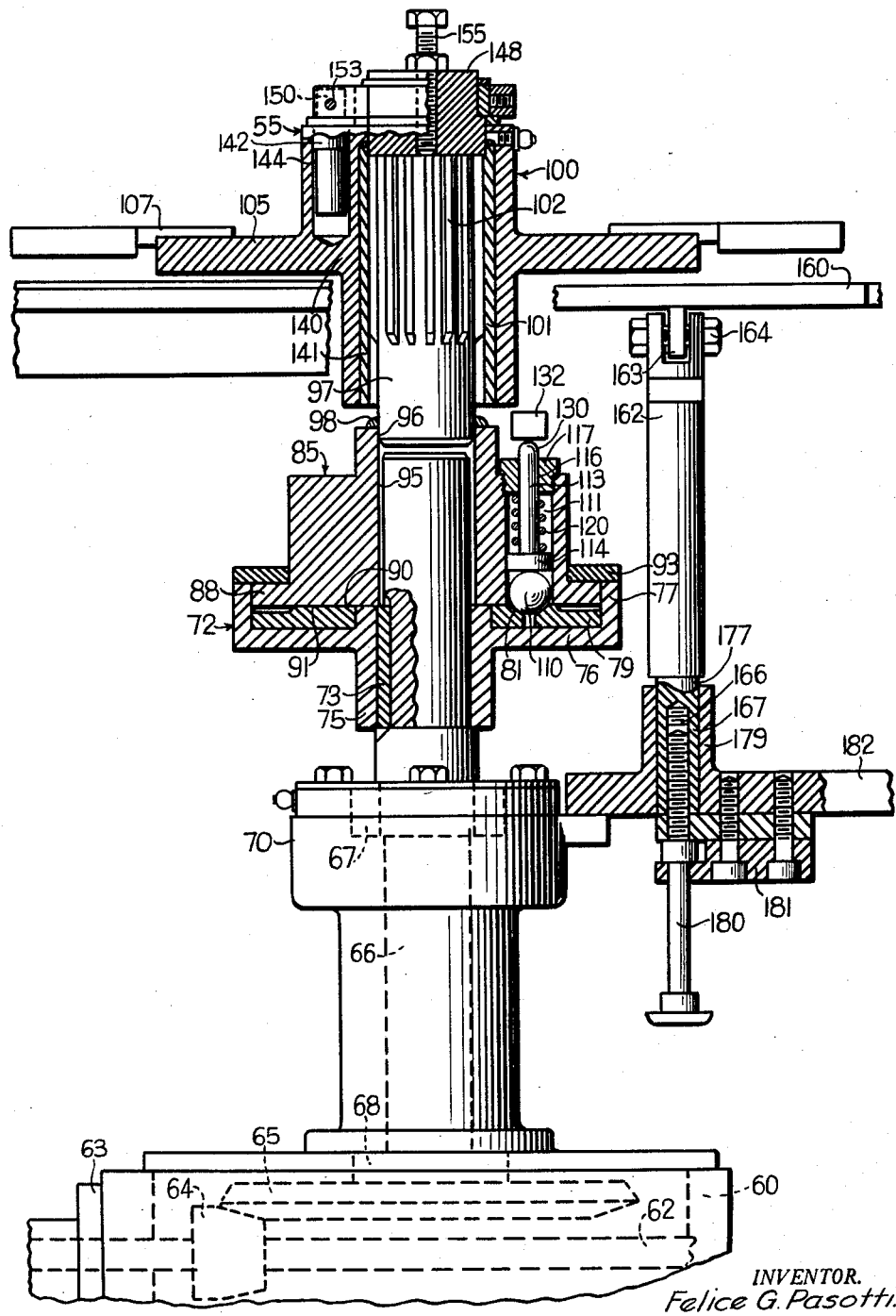
Figure 3 is a front elevational view, partially in section, showing the article transferring apparatus of the preceding figures in enlarged relationship. The section is taken substantially along the line 3—3 of Figure 2.

Reference is next made to Figure 3, which illustrates the structure of the article transferring apparatus 55 and 56. The detailed illustration and description are directed to the loading apparatus 55, it being understood that the unloading apparatus 56 is of substantially the same construction. The apparatus 55 includes a base housing 60 which is supported by the frame 20 of the fire finishing machine. A horizontal shaft 62 is rotatably carried by bearings 63 which are supported by the housing 60. Shaft 62 is driven in precise synchronization with the conveyor belt 53 and the turntable 25, and to accomplish this it is preferable to drive the shaft 62, turntable and conveyor all from the same prime mover. Shaft 62 carries the beveled gear 64 which drives the beveled gear 65 keyed to the vertically disposed shaft 66. The shaft 66 is rotatably supported by an upper bearing 67 and a lower bearing 68 which are mounted in a support casting 70. The upper end of shaft 66 carries a lower clutch member indicated generally at 72 with such clutch member being keyed to shaft 66 by means of the key 73. The clutch member 72 includes a hub portion 75, radially extending portion 76, and an upwardly extending portion 77. An annular plate 79 is supported by the clutch portion 72 and the upper surface of the plate 79 is provided with a plurality of recesses 81 that are equally spaced in a circular pattern concentric with the axis of shaft 66.

An upper clutch portion, indicated generally at 85, consists of a block 87, formed with a peripherally extending flange 88 formed on the lower portion thereof. The lower surface 90, of the block 87, is adapted to rest on the upper surface 91 of the annular plate 79. A retaining ring 93 is secured to the upwardly extending flange 77 of the lower clutch portion 72 and extends inwardly above the flange 88 formed on the block 87. The block 87, of the upper clutch portion 85, is provided with a vertical hole 95 of greater diameter than the upper end of the shaft 66. Hence the upper clutch portion 85 is thereby free to rotate about the shaft 66, which drives the lower clutch portion 72, under certain conditions of operation later to be described herein. The upper portion of the block 87 is adapted to receive the lower end 96 of a shaft 97 in the hole 95. The block 87 is secured to the shaft in a suitable manner such as welding as indicated at 98.

The upper end of shaft 97 carries an article transferring head indicated generally at 100. The head 100 is provided with an internal spline 101 which is in sliding engagement with the external spline 102 formed on the shaft 97. The head 100 further includes an outwardly extending flange 105 which carries a plurality of radially extending arms 107.

Referring again to the upper clutch portion 85 and the lower clutch portion 72, such clutch portions are normally retained in driving relationship by means of a plurality of balls 110 each of which is carried freely in a hole 111 in the block 87 with each of the balls being constantly urged downwardly so that it will drop into a recess 81 if the upper and lower clutch portions are aligned such that the hole 111 is aligned above a recess 81. Each of the holes 111 slidably carries a plunger 113. The lower end of the plunger 113 is provided with a range 114 which slidably engages the inner walls of the bore 111, and the upper shank portion of the plunger 113 is slidably guided in a hole 116 formed through a threaded retainer 117. The retainer 117 is screwed into the upper portion of the hole 111. A compression spring 120 is interposed between the retainer 117 and the flange 114 for constantly urging the plunger downwardly.

In operation of the article transferring apparatus 55, when a mispositioned or upset article is presented to the apparatus in such a way as to jam between the arms 107 and a guide 125, provided to guide the articles from the conveyor to the apparatus, then the head 100 will be arrested due to the presence of the mispositioned article. When the jam occurs, the upper clutch portion 85 will be arrested since it is keyed to the same shaft as the head 100. The lower clutch portion 72, however, will continue to rotate since it is keyed to the continuously driven shaft 66. Hence, relative motion will occur between the lower portion 90 of the block 87 and the upper surface 91 of the annular plate 79. When this occurs, the balls 110 will roll upwardly out of the circular depressions 81. As the annular plate 79 is rotated underneath the stationary lower surface of the block 87, the balls will roll on the surface 91 moving beneath them. The balls, however, will each intermittently enter and leave the depressions 81. This condition will continue so long as the head 100 is jammed by an obstruction such as is caused by mispositioned articles.

Upon removal of the obstructing articles, the head 100 will immediately commence to rotate. If the balls are contacting surface 91, and not in the circular depression 81, at the instant the obstruction is removed, then rotation of head 100 will commence, due to the frictional engagement between the balls 110 and the upper surface 91 of the plate 79. If the balls 110 happen to be seated in the depressions 81 at the instant the obstruction is removed, then rotation of head 100 will be caused due to the latching action of the balls in the depressions. In most instances, however, rotation of the head 100 will commence when the balls are in contact with the surface 91, rather than when the balls are seated in the circular depression 81, since the balls are seated only momentarily, and for short portions of the total time.

Upon removal of an obstruction, and under the general clutch configuration wherein the balls 100 are contacting the surface 91, as contrasted with being seated in depressions 81, the upper end 130 of the plunger 113 will be extended upwardly in the manner illustrated in Figure 4. As the head 100 commences rotation with the plunger extended upwardly, and with the balls 110 riding, but not rotating, on the upper surface 91 of the plate 79, then the upper end 130 of the plunger 113 will be caused to engage a stationary stop 132 interposed in the path of the raised upper end of the plunger. The stop 132 is supported by the frame of the apparatus, and upon engagement of the stop 132, by the plunger 113, the head 100 and upper clutch portion 85 will be momentarily arrested, in the manner illustrated in Figure 5, until the plate 79 has rotated the depressions 81 to positions underneath the momentarily arrested balls 110. When this occurs, balls 110 will move downwardly into the depressions 81 and the upper end 130 of the plunger 113 will immediately drop clear of the stop 132. With the balls 110 latched with the depressions 81 relative motion between the surfaces 90 and 91 will immediately cease and the upper clutch portion 85 and the head 100 will be driven by the lower clutch portion 72.

It should be noted that the depressions 81, in the plate 79, and the balls 110 are precisely located, on their respective clutch portions, so that when the balls and depressions are latched in driving relationship, the arms 107 will be precisely positioned and synchronized with the movement of the articles being presented to the article transfer apparatus and with the movement of the fixtures 44 on the turntable 25.

For purposes of effecting precise angular adjustment of the head 100, relative to the spline shaft 97 and the upper clutch portion 85, it will be noted that the head 100 is provided with an outer sleeve portion 140 and an inner sleeve portion 141. Inner sleeve portion 141 is splined to receive the upper end of shaft 97. The outer sleeve portion 140, however, is free to be rotated about inner sleeve portion 141. Inner sleeve portion 141 carries a block 148 secured to its upper end and the outer sleeve 140 is also free to rotate about the block as well as the inner sleeve 141. Block 148 carries a downwardly extending pin 150 which extends into a hole 144. With reference to Figure 8, it is seen that the block 148 carries two horizontal bolts 152 and 153 which extend inwardly and engage each side of pin 150. With this arrangement, lateral movement of bolts 152 and 153 will shift the pin 150, and hence rotate the outer head portion 140 relative to the inner sleeve 141. In this manner, the direction of extension of the arms 107 can be readily and precisely adjusted.

For effecting precise vertical adjustments of the head 100 relative to the conveyor and fixture, the block 148 is provided with a vertical threaded hole which carries the bolt 155. The lower end of the bolt 155 extends through the block 148 and engages the upper end of the shaft 97 such that rotation of bolt 155 raises and lowers head 100 relative to the shaft 97 along which the head is free to slide.

Reference is again made to Figure 3 which illustrates a dead plate 160 which forms a surface over which the articles are transported between the conveyor and the fixture cups. A second dead plate 161 is provided for the unloading apparatus with the location of the dead plates being illustrated in the plan view of Figure 2. Adjusting means are provided whereby the dead plates are not only easily adjustable in height but also in inclination, thus giving control over transition of the articles whereby they can be prevented from toppling over. To effect vertical adjustment and inclination of the dead plates 160, the flanges 163 on the lower surfaces of the dead plates are pivotally secured to the vertically extending shaft 162 by means of bolts 164. The lower end of shaft 162 is provided with a threaded hole 166 formed in a neck portion 167 and is slideably guided by a frame member 179. The threaded element 180 is rotatably carried by a bracket 181 carried on a frame member 182, such that rotation of the threaded elements 180 will raise and lower the shafts 162 which will effect various positions of vertical adjustment and inclination of the dead plates 160.

In operation, articles are carried along on the conveyor belt 53, in spaced relationship, and the articles are sequentially engaged by the guide 125 and an arm 107. The position and speed of arms 107 are precisely synchronized with the speed and position of the article whereby its linear path of movement is smoothly transitioned into an arcuate path of travel across the dead plate 160. The position and speed of arms 107 are also precisely synchronized with the movement of the fixtures 44. Such synchronized operation may be effectively achieved by driving all of the apparatus from the same prime mover. The clutch means which automatically disengages the article transfer head 100 from its driving mechanism, is adapted to drive the head only in a proper indexed configuration, relative to the shaft on which it is mounted, wherein the arms 107 are caused to engage each successive article in the proper manner and at the proper time. When an article is mispositioned, or upset, so as to lodge between the guide 125 and the head 100, motion of the head 100 ceases due to the action of the clutch mechanism as previously described. The articles will, of course, continue to pile up at the head 100 so long as the jammed condition is allowed to continue. The operator of the machine, however, will remove the article producing the jam, as quickly as possible.

Upon removing of the articles producing the jam, the automatic resynchronizing action will take place. Reference is next made to schematic Figures 4 through 6, which are provided to clearly illustrate such resynchronizing action.

Referring first to Figure 4, assume that the article engaging arms of the article transferring head were jammed in a position of rotation whereby the plunger 113 is maintained stationary in spaced relationship with stop 132. The lower clutch plate 79, however, will be rotating as indicated by the arrow 200. Upon removal of the jam, block 87 and the entire upper clutch portion and article engaging apparatus will commence motion. Such motion commences even though the balls are out of the depression due to the frictional engagement between the balls 110 and the upper surface 91 on the lower clutch portion. With the balls 110 out of alignment with the depressions 81, however, the arms 107 will not be properly indexed with the articles on the conveyor when motion of the head 100 is resumed. Thus the initial motion of the head is unsynchronized due to the fact that the balls 110 are not aligned with depressions 81 and will not readily roll back into the depressions since they are frictionally restrained from rotating between the upper surface 91 and the plunger flange 114. Such condition of unsynchronized motion, however, is only momentary since the raised plunger 113 is rapidly caused to engage the stop 132 as seen in Figure 5. The motion of the upper clutch portion is thereby arrested, but only momentarily, since the rotating lower plate 79 quickly presents the depressions under the balls. The balls and plungers then drop downwardly into latched synchronized engagement with the depressions as illustrated in Figure 6 and continuous motion of the upper clutch block 87 commences as indicated by the arrow 202 in Figure 6. It will therefore be understood that Figure 6 illustrates the normal latched configuration of the clutch portions, Figure 4 illustrates the configuration during a jam, and Figure 5 illustrates the momentary configuration which occurs during resynchronization.

In summary, it is seen that the present invention provides a novel article transferring apparatus for efficiently transferring articles between separate article transporting means. The clutch mechanism of the apparatus is adapted to automatically disengage the article transfer head from the drive mechanism upon jamming of the head by mispositioned articles. Moreover, the clutch mechanism is adapted to automatically and smoothly effect motion of the mechanism upon removal of the article causing the jam, and such motion is resumed in precise synchronization with the motions of the separate article transporting means between which the present apparatus is transferring articles.

While the form of embodiment of the present invention as herein disclosed constitutes a preferred form, it is to be understood that other forms might be adopted, all coming within the scope of the claims which follow.

I claim:

1. An article handling apparatus for transporting articles from a first conveying means to a second conveying means comprising, in combination, article transfer means located between said two conveying means; driving means for said article transfer means; clutch means for said article transfer means, said clutch means being adapted to automatically disengage said article transfer means from said driving means responsive to jamming of said article transfer means by said article; a first clutch portion connected to said article transfer means; a second clutch portion connected to said driving means, one of said clutch portions including a guide and the other of said clutch portions including a surface confronting an end of said guide and provided with a recess; latch means movably carried in said guide, said latch means including a latch portion engageable with said surface and a shoulder portion; means constantly urging said latch means towards said surface; and a stop means mounted stationary relative to said clutch portions, said stop means being disposed in the path of said shoulder portion when said latch portion engages said surface and clear of the path of said shoulder portion when said latch portion is disposed in said recess.

2. An article handling apparatus for transporting articles from a first conveying means to a second conveying means comprising, in combination, article transfer means located between said two conveying means; driving means for said article transfer means; clutch means for said article transfer means, said clutch means including a driven portion connected to said transfer means and a driving portion connected to said driving means; a yieldable latching means carried by said driven clutch portion to automatically disengage said article transfer means from said driving means responsive to jamming of said article transfer means by said articles, said latching means including a shoulder that rotates with said driven clutch portion; and means forming a stationary shoulder engageable with said first mentioned shoulder for automatically effecting resynchronized motion of said article transfer means responsive to removal of the articles causing said jam.

3. An article handling apparatus for transporting articles from a first conveying means to a second conveying means comprising, in combination, article transfer means located between said two conveying means; an article engaging member mounted on said article transfer means; plate means beneath said article engaging member and forming a surface along which articles are moved in transporting same between said two supporting means; means for adjusting the elevation and inclination of said plate means relative to said supporting means and said conveyor; driving means for said article transfer means; clutch means for said article transfer means, said clutch means including a driven portion connected to said transfer means and a driving portion connected to said driving means; a yieldable latching means carried by said driven clutch portion to automatically disengage said article transfer means from said driving means responsive to jamming of said article transfer means by said articles, said latching means including a shoulder that rotates with said driven clutch portion; and means forming a stationary shoulder engageable with said first mentioned shoulder for automatically effecting resynchronized motion of said article transfer means responsive to removal of the articles causing said jam.

4. An article handling apparatus for transporting articles from a first conveying means to a second conveying means comprising, in combination, article transfer means located between said two conveying means; a frame for supporting said article transfer means; a vertically extending shaft rotatably supported by said frame; head means mounted on said shaft and provided with a plurality of radially extending members adapted to successively engage and transport articles between said two conveying means; driving means for said article transfer means; clutch means operatively connected between said driving means and said article transfer means, said clutch means including a driving portion and a driven portion; latch means carried by said clutch means effecting disengagement of said two clutch portions responsive to jamming of said article transfer means by said articles, said latch means being adapted to effect engagement of said clutch portions only in certain positions of relative rotation wherein said radially extending members on said head means are caused to engage said articles in synchronized relationship with the presentation of articles to said transfer means, said latching means including a shoulder that rotates with said driven clutch portion; and a second shoulder mounted stationary relative to said clutch portions for engagement by said first mentioned shoulder to automatically effect resynchronized motion of said article transfer means responsive to removal of the articles causing said jam; and means for adjustably rotating said head means relative to said shaft means.

5. An article handling apparatus comprising, in combination, a frame; head means rotatably mounted on said frame and provided with a plurality of radially extending members adapted to successively engage, transport and disengage articles; means supported by the frame and forming a horizontally extending surface along which articles are moved by said head means; driving means for rotating said head means in synchronized relationship with article delivery means and article receiving means between which the apparatus is operated; clutch means operatively connected between said head and said driving means, said clutch means including a driving portion and a driven portion, one of said clutch portions being provided with a guide having an end confronting a surface on the other of said clutch portions; means forming a spring retainer at the other end of said guide; a member moveably carried in said guide and including a second surface confronting said first mentioned surface; a bearing member between said confronting surfaces; means forming a first latch portion carried by said moveable member, said first latch portion being moveable from a first position to a second position when said bearing member enters said depression; and means forming a second latch portion mounted to said frame and disposed in the path of movement of said first latch portion when said first latch portion is in said first position, said second latch portion being clear of said path of movement when said first latch portion is in said second position.

6. An article handling apparatus comprising, in combination, a frame; head means rotatably mounted on said frame and provided with a plurality of radially extending members adapted to successively engage, transport, and disengage articles; means supported by the frame and forming a horizontally extending surface along which articles are moved by said head means; driving means for rotating said head means in synchronized relationship with article delivery means and article receiving means between which the apparatus is operated; clutch means operatively connected between said head and said driving means, said clutch means being adapted to automatically disengage said head from said driving means responsive to an obstruction to movement of said head; said clutch means including a driving portion and a driven portion; a first latch means carried by said clutch means for disengagingly connecting said driven portion with said driving portion; and a second latch means operatively engageable with said first latch means responsive to removal of the articles causing said jam for effecting latched synchronized engagement between said two clutch portions.

References Cited in the file of this patent

UNITED STATES PATENTS

| | | |
|---|---|---|
| 1,075,891 | Ayars | Oct. 4, 1913 |
| 1,106,884 | Miller | Aug. 11, 1914 |
| 1,604,440 | Wilkinson | Oct. 26, 1926 |
| 1,998,093 | Oslund | Apr. 16, 1935 |
| 2,338,841 | Fedorchak et al. | Jan. 11, 1944 |
| 2,600,674 | Natkins | June 17, 1952 |